(12) United States Patent
Cheng et al.

(10) Patent No.: US 11,385,740 B2
(45) Date of Patent: Jul. 12, 2022

(54) ORGANIC LIGHT-EMITTING DISPLAY PANEL AND METHOD FOR DRIVING THE SAME, AND DISPLAY DEVICE

(71) Applicants: WUHAN TIANMA MICRO-ELECTRONICS CO., LTD., Wuhan (CN); WUHAN TIANMA MICROELECTRONICS CO., LTD. SHANGHAI BRANCH, Shanghai (CN)

(72) Inventors: Lin Cheng, Shanghai (CN); Yingying Wu, Shanghai (CN); Shuai Yang, Shanghai (CN); Xingyao Zhou, Shanghai (CN)

(73) Assignees: WUHAN TIANMA MICRO-ELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 17/213,000

(22) Filed: Mar. 25, 2021

(65) Prior Publication Data

US 2021/0216188 A1    Jul. 15, 2021

(30) Foreign Application Priority Data

Nov. 30, 2020 (CN) .......................... 202011380523.5

(51) Int. Cl.
*G09G 3/3266* (2016.01)
*G09G 3/3275* (2016.01)
*G06F 3/041* (2006.01)

(52) U.S. Cl.
CPC ....... *G06F 3/04166* (2019.05); *G09G 3/3266* (2013.01); *G09G 3/3275* (2013.01); *G09G 2320/0233* (2013.01)

(58) Field of Classification Search
None
See application file for complete search history.

(56) References Cited

U.S. PATENT DOCUMENTS

| | | | |
|---|---|---|---|
| 2018/0130421 A1* | 5/2018 | Zhou | G09G 3/3266 |
| 2019/0235663 A1* | 8/2019 | Xuan | G06F 3/04166 |
| 2021/0349601 A1* | 11/2021 | Chen | G06F 3/04166 |

FOREIGN PATENT DOCUMENTS

| | | | |
|---|---|---|---|
| CN | 105843442 A | 8/2016 | |
| CN | 107622752 A | 1/2018 | |

(Continued)

OTHER PUBLICATIONS

State Intellectual Property Office of the People's Republic of China, First Office Action, Chinese Patent Application No. 202011380523.5, dated Sep. 14, 2021, 15 pages.

*Primary Examiner* — Nitin Patel
*Assistant Examiner* — Amen W Bogale
(74) *Attorney, Agent, or Firm* — Christensen O'Connor Johnson Kindness PLLC

(57) ABSTRACT

An organic light-emitting display panel and a method for driving the same, and a display device are provided. The organic light-emitting display panel includes a light-emitting driving circuit and a touch signal driving circuit. The light-emitting driving circuit is configured to provide, within a scanning duration of each frame, a light-emitting control signal having b1 light-emitting cycles and a duty cycle of a1 to each row of pixels. A display area scanning duration includes at least one touch duration during which the touch signal driving circuit provides a touch signal to the display (Continued)

panel and the number of rows of the light-emitting pixel-rows of the display panel remains unchanged.

16 Claims, 5 Drawing Sheets

(56) References Cited

FOREIGN PATENT DOCUMENTS

| CN | 109388269 A | 2/2019 |
| CN | 109669583 A | 4/2019 |
| CN | 111489692 A | 8/2020 |

\* cited by examiner

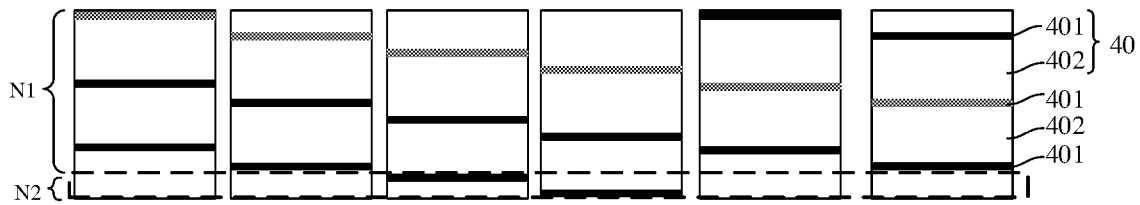
FIG. 4A  FIG. 4B  FIG. 4C  FIG. 4D  FIG. 4E  FIG. 4F
FIG. 4G  FIG. 4H  FIG. 4I  FIG. 4J  FIG. 4K  FIG. 4L
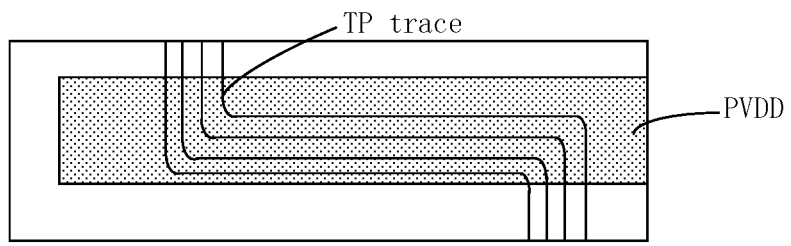
FIG. 5
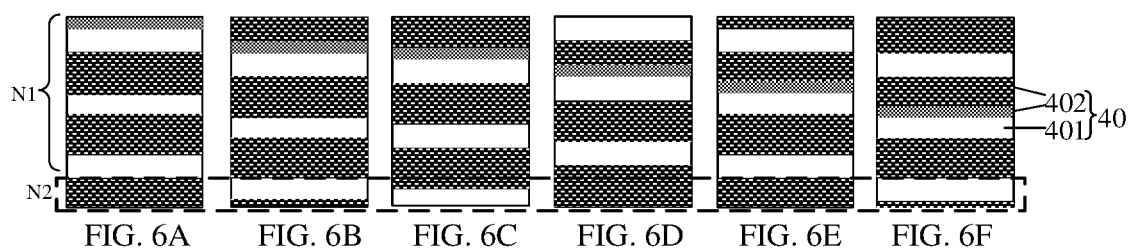
FIG. 6A  FIG. 6B  FIG. 6C  FIG. 6D  FIG. 6E  FIG. 6F
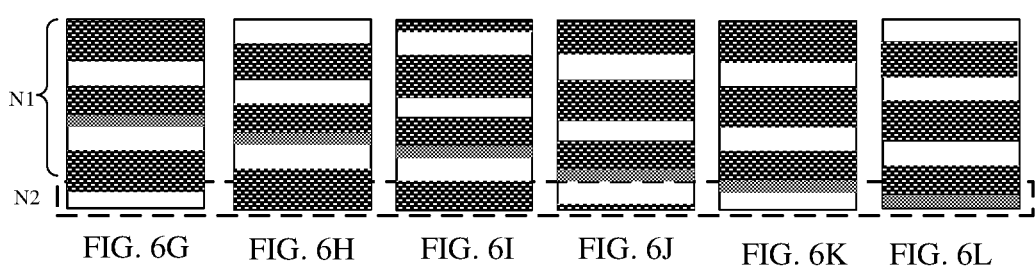
FIG. 6G  FIG. 6H  FIG. 6I  FIG. 6J  FIG. 6K  FIG. 6L

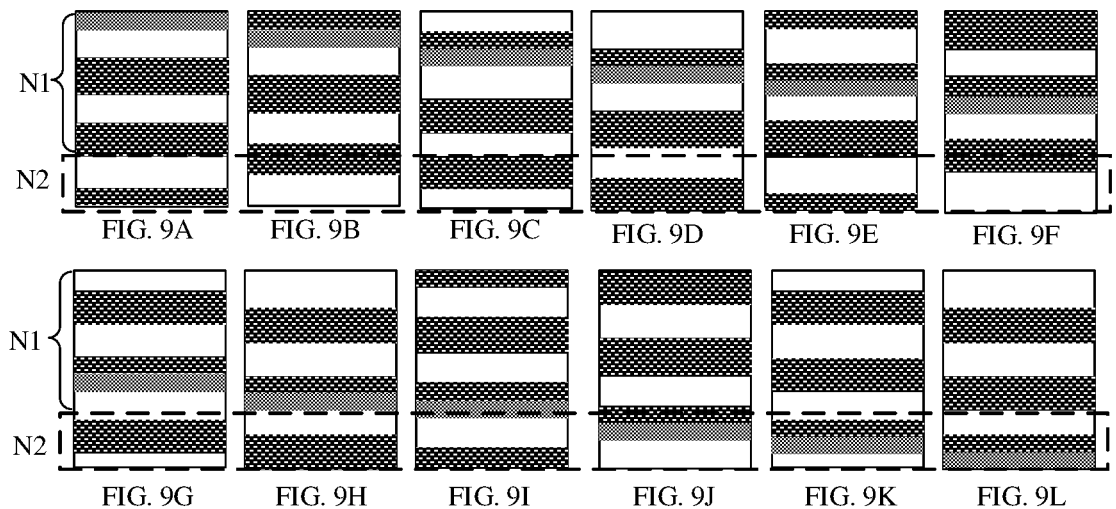
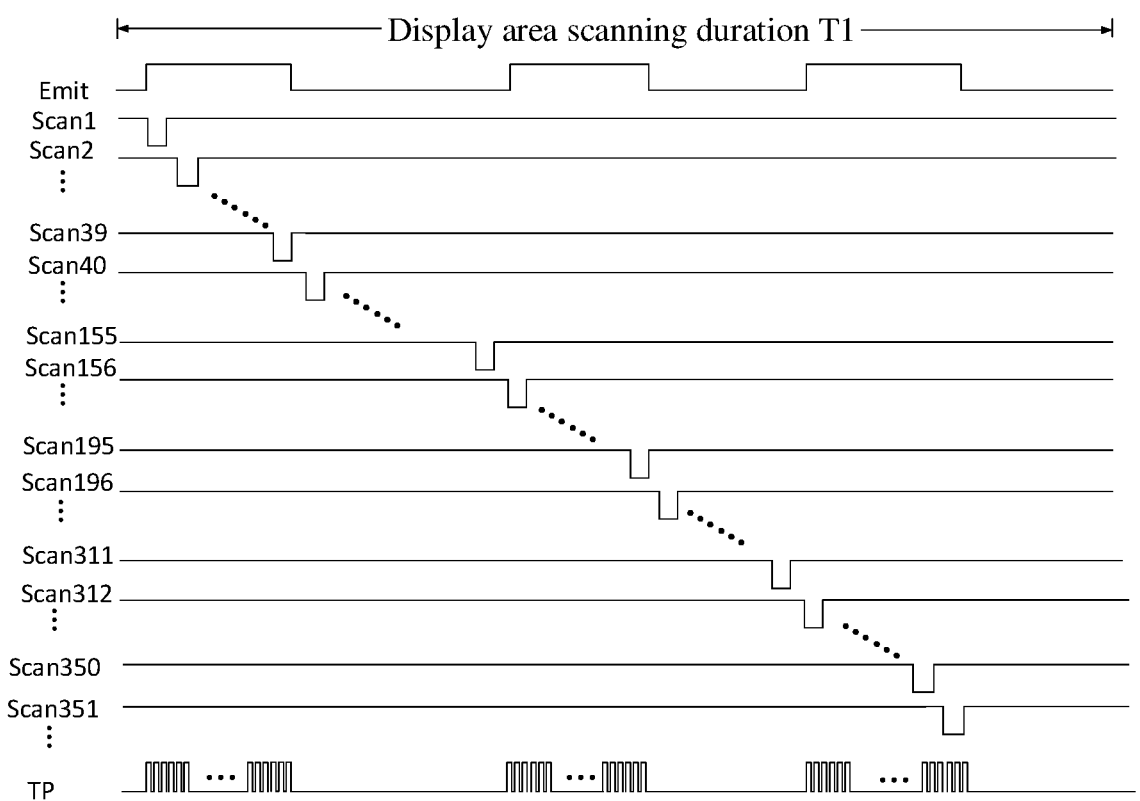
FIG. 10

ORGANIC LIGHT-EMITTING DISPLAY PANEL AND METHOD FOR DRIVING THE SAME, AND DISPLAY DEVICE

CROSS-REFERENCE TO RELATED APPLICATIONS

The present application claims priority to Chinese Patent Application No. 202011380523.5, filed on Nov. 30, 2020, the content of which is incorporated herein by reference in its entirety.

TECHNICAL FIELD

The present disclosure relates to the field of display technology, and more particularly, to an organic light-emitting display panel and a method for driving the same, and a display device.

BACKGROUND

In the organic light-emitting display panel having a touch function in the related art, in order to reduce interference caused by noises generated by touch and display, the touch function and the display function generally are performed in a time-division manner.

In the past two years, with continuous promotion and popularization of a "high-frequency" product concept, data charging time for a panel display, which is a time for data to be written into the driving transistor, becomes shorter and shorter during a period of each frame, and it becomes more and more difficult to perform a touch driving and a display driving in a time-division manner.

Therefore, for the organic light-emitting display panel, how to realize high-frequency display while not affect a touch function of a display screen has increasingly become a topic in the organic light-emitting display technologies.

SUMMARY

In one aspect, an embodiment of the present disclosure provides an organic light-emitting display panel including a display area and a non-display area. The organic light-emitting display panel includes: a plurality of rows of pixels arranged in the display area; a scanning driving circuit arranged in the non-display area, wherein the scanning driving circuit is configured to, within a scanning duration of each frame, provide a scanning control signal to each row of the plurality of rows of pixels; a light-emitting driving circuit arranged in the non-display area, where the light-emitting driving circuit is configured to, within the scanning duration of each frame, provide a light-emitting control signal having b1 light-emitting cycles to each row of the plurality of rows of pixels, where b1 is a positive integer, and a duty cycle of an effective turn-on signal of the light-emitting control signal is a1; and a data driving circuit arranged in the non-display area and including a source signal driving circuit and a touch signal driving circuit. The scanning duration of each frame includes a display area scanning duration and a front-back porch duration, the display area scanning duration is $N1*t$ during which $N1$ rows of the plurality of rows of pixels are scanned, the front-back porch duration is $N2*t$ that is equal to a period for which $N2$ rows of the plurality of rows of pixels are scanned, and the scanning duration of each frame is $N*t$ that is equal to a period for which $N$ rows of the plurality of rows of pixels are scanned, where $N=N1+N2=n*b1$, and $n$ is a positive integer. The display area scanning duration includes at least one touch duration during which the touch signal driving circuit provides a touch signal to the organic light-emitting display panel. During the at least one touch duration, a number $M1$ of rows of light-emitting pixel-rows of the display panel remains unchanged, and each of the light-emitting pixel-rows is a row of the plurality of rows of pixels, in which the pixels thereof are supplied with the effective turn-on signal of the light-emitting control signal.

In a second aspect, an embodiment of the present disclosure provides a display device, including an organic light-emitting display panel. The organic light-emitting display panel includes a display area and a non-display area. The organic light-emitting display panel includes: a plurality of rows of pixels arranged in the display area; a scanning driving circuit arranged in the non-display area, where the scanning driving circuit is configured to, within a scanning duration of each frame, provide a scanning control signal to each row of the plurality of rows of pixels; a light-emitting driving circuit arranged in the non-display area, wherein the light-emitting driving circuit is configured to, within the scanning duration of each frame, provide a light-emitting control signal having b1 light-emitting cycles to each row of the plurality of rows of pixels, where b1 is a positive integer, and a duty cycle of an effective turn-on signal of the light-emitting control signal is a1; and a data driving circuit arranged in the non-display area and including a source signal driving circuit and a touch signal driving circuit. The scanning duration of each frame includes a display area scanning duration and a front-back porch duration, the display area scanning duration is $N1*t$ during which $N1$ rows of the plurality of rows of pixels are scanned, the front-back porch duration is $N2*t$ that is equal to a period for which $N2$ rows of the plurality of rows of pixels are scanned, and the scanning duration of each frame is $N*t$ that is equal to a period for which $N$ rows of the plurality of rows of pixels are scanned, where $N=N1+N2=n*b1$, and $n$ is a positive integer. The display area scanning duration includes at least one touch duration during which the touch signal driving circuit provides a touch signal to the organic light-emitting display panel. During the at least one touch duration, a number $M1$ of rows of light-emitting pixel-rows of the display panel remains unchanged, and each of the light-emitting pixel-rows is a row of the plurality of rows of pixels, in which the pixels thereof are supplied with the effective turn-on signal of the light-emitting control signal.

In a third aspect, an embodiment of the present disclosure provides a method for driving an organic light-emitting display panel. The organic light-emitting display panel includes a display area and a non-display area. The organic light-emitting display panel includes: a plurality of rows of pixels arranged in the display area; a scanning driving circuit arranged in the non-display area, wherein the scanning driving circuit is configured to, within a scanning duration of each frame, provide a scanning control signal to each row of the plurality of rows of pixels; a light-emitting driving circuit arranged in the non-display area, wherein the light-emitting driving circuit is configured to, within the scanning duration of each frame, provide a light-emitting control signal having b1 light-emitting cycles to each row of the plurality of rows of pixels, where b1 is a positive integer, and a duty cycle of an effective turn-on signal of the light-emitting control signal is a1; and a data driving circuit arranged in the non-display area and including a source signal driving circuit and a touch signal driving circuit. The scanning duration of each frame includes a display area scanning duration and a front-back porch duration, the display area scanning duration is N1*t during which N1 rows of the plurality of rows of pixels are scanned, the front-back porch duration is N2*t that is a period for which N2 rows of the plurality of rows of pixels are scanned, and the scanning duration of each frame is N*t that is equal to a period for which N rows of the plurality of rows of pixels are scanned, where N=N1+N2=n*b1, and n is a positive integer. The display area scanning duration includes at least one touch duration during which the touch signal driving circuit provides a touch signal to the organic light-emitting display panel. During the at least one touch duration, a number M1 of rows of light-emitting pixel-rows of the display panel remains unchanged, and each of the light-emitting pixel-rows is a row of the plurality of rows of pixels, in which the pixels thereof are supplied with the effective turn-on signal of the light-emitting control signal. The method includes: providing, by the light-emitting driving circuit, the light-emitting control signal having b1 light-emitting cycles to each row of the plurality of rows of pixels during the scanning duration of each frame; scanning, by the scanning driving circuit, each row of the plurality of rows of pixels during the scanning duration of each frame; writing, by the source signal driving circuit, source data to each row of the plurality of rows of pixels during the scanning duration of each frame, and providing, by the touch signal driving circuit, a touch driving signal to the organic light-emitting display panel during each frame; providing, by the touch signal driving circuit, the touch signal to the organic light-emitting display panel; and remaining the number of rows of light-emitting pixel-rows of the organic light-emitting display panel unchanged.

BRIEF DESCRIPTION OF DRAWINGS

In order to more clearly illustrate the technical solutions in the embodiments of the present disclosure or the related art, the accompanying drawings used in the embodiments or the related art are briefly described below. The drawings described below are merely some embodiments of the present disclosure. Based on these drawings, those of ordinary skill in the art can obtain other drawings.

FIGS. 4A to 4L illustrate schematic diagrams of an organic light-emitting display panel at different moments;

FIG. 5 is a schematic diagram of traces located in a fan-out area provided by an embodiment of the present disclosure;

FIGS. 6A to 6L illustrate schematic diagrams of an organic light-emitting display panel at different moments;

FIGS. 9A to 9L illustrate schematic diagrams of an organic light-emitting display panel at different moments;

FIG. 10 is a timing sequence diagram of working of an organic light-emitting display panel provided by the present disclosure;

DESCRIPTION OF EMBODIMENTS

Figure 1:
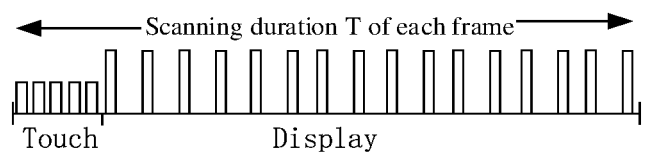
FIG. 1 is a timing sequence diagram of performing a touch driving and a display driving in a time-division manner in the related art.

FIG. 1 is a timing sequence diagram of performing a touch driving and a display driving in a time-division manner in the related art. As shown in FIG. 1, taking a working frequency of 60 Hz as an example, one frame last 16.7 ms during which touch function is performed for about 2 ms and display function is performed for the remaining time, i.e., about 14.7 ms. In combination with requirement of narrow steps, the number of multiplexers (MUX) is increased, time for a source signal driving circuit to transmit data to each row of pixels is reduced, and if the working frequency is further increased, the time for the source signal driving circuit to transmit data to each row of pixels is further reduced, resulting in increased display Mura. Mura means that a display image has non-uniform luminance in the form of a spot at a pixel or a certain area.

In view of this, embodiments of the present disclosure provide an organic light-emitting display panel, a method for driving the organic light-emitting display panel, and a display device.

To make technical solutions of the embodiments of the present disclosure clearer, the technical solutions in the embodiments of the present disclosure will be described clearly in conjunction with the drawings in the embodiments of the present disclosure. The embodiments described are a part of the embodiments of the present disclosure, but not all the embodiments.

Shapes and sizes of various components in the drawings do not necessarily reflect actual scales and are only intended to illustrate the content of the present disclosure.

The terms used in the embodiments of the present disclosure are merely for the purpose of describing particular embodiments and not intended to limit the present disclosure. Unless otherwise noted in the context, the singular form expressions "a", "an", "the" and "said" used in the embodiments and appended claims of the present disclosure are also intended to represent a plural form.

It should be understood that the term "and/or" as used herein is merely an association describing the associated object, indicating that there may be three relationships. For example, A and/or B may indicate three cases: A alone; A and B; B alone. In addition, a character "/" herein generally indicates that the contextual objects are in an "or" relationship.

Figure 2:
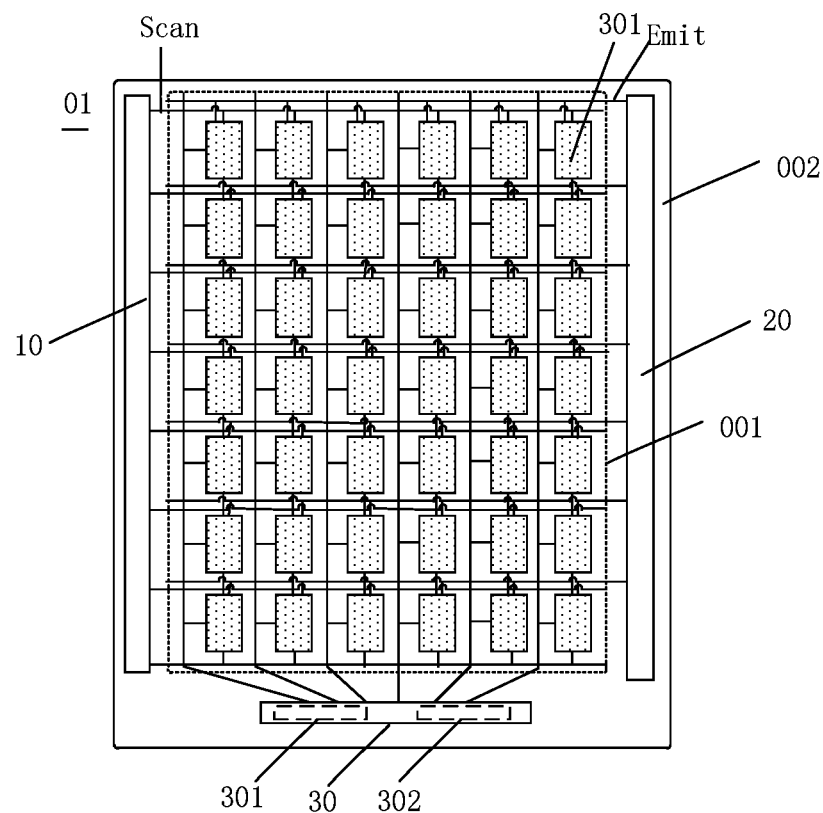
FIG. 2 is a schematic diagram of an organic light-emitting display panel provided by an embodiment of the present disclosure.

FIG. 2 is a schematic diagram of an organic light-emitting display panel provided by an embodiment of the present disclosure. As shown in FIG. 2, an organic light-emitting display panel 01 includes a display area 001 and a non-display area 002. The display area 001 includes multiple rows of pixels. The non-display area 002 includes a scanning driving circuit 10, and the scanning driving circuit 10 is configured to provide a scanning control signal for each row of pixels 301 located in the display area during a scanning duration T of each frame. The scanning driving circuit 10 provides scanning control signals to each row of pixels 301 through a gate line Scan.

The scanning duration T of each frame incudes a display area scanning duration T1 and a front-back porch duration T2. Assuming that time for the scanning driving circuit to scan one row of pixels is t, the number of rows of pixels in the display area is N1, and the number of rows of pixels corresponding to the front-back porch is N2, then the display area scanning duration T1 is equal to N1*t, the front-back porch duration T2 is equal to N2*t that is equal to a period for which the N2 rows of the pixels are scanned, the scanning duration of each frame T is equal to N*t, and N=N1+N2=n*b1, where n is a positive integer. It should be noted that the number of rows of pixels corresponding to the front-back porch refers to the number of rows of pixels that can be scanned by the scanning driving circuit in a period last for the front-back porch duration.

Figure 3:
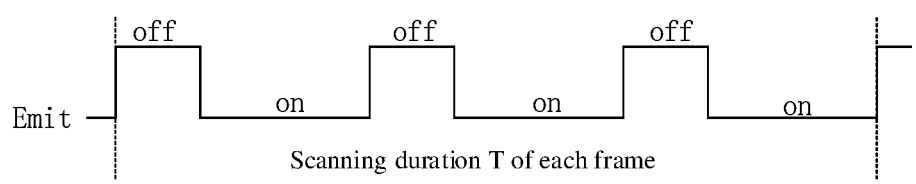
FIG. 3 is a timing sequence diagram of a light-emitting control signal provided by an embodiment of the present disclosure.

The display panel further includes a light-emitting driving circuit 20 arranged in the non-display area 002 configured to provide the light-emitting control signal to pixels in each row during the scanning duration T of each frame. The light-emitting driving circuit 20 provides the light-emitting control signal to each row of pixels 301 through a light-emitting control signal line Emit. The light-emitting control signal has b1 (b1 is a positive integer) light-emitting cycles, and a duty cycle of an effective turn-on signal is a1. For example, as shown in FIG. 3, the light-emitting control signal provided by the light-emitting driving circuit 20 to each row of pixels has three light-emitting cycles. Each light-emitting cycle is composed of a high-voltage signal H that controls the row of pixels that do not emit light and a low-voltage signal L that controls the row of pixels to emit light, and the low-voltage signal L accounts for 75% of one light-emitting cycle, i.e., a1=75%. Therefore, within the scanning time T of each frame, under control of the light-emitting driving circuit 20, the organic light-emitting display panel 01 presents bright and dark stripes that are alternated and continuously scroll down.

FIG. 4A to FIG. 4L illustrate schematic diagrams of images where the bright and dark stripes change during one frame. Specifically, FIG. 4A is a schematic diagram of an image of bright and dark stripes at a moment (time) t1, FIG. 4B is a schematic diagram of an image of bright and dark stripes at a moment t2, FIG. 4C is a schematic diagram of an image of bright and dark stripes at a moment t3, FIG. 4D is a schematic diagram of an image of bright and dark stripes at a moment t4, FIG. 4E is a schematic diagram of an image of bright and dark stripes at a moment t5, FIG. 4F is a schematic diagram of an image of bright and dark stripes at a moment t6, FIG. 4G is a schematic diagram of an image of bright and dark stripes at a moment t7, FIG. 4H is a schematic diagram of an image of bright and dark stripes at a moment t8, FIG. 4I is a schematic diagram of an image of bright and dark stripes at a moment t9, FIG. 4J is a schematic diagram of an image of bright and dark stripes at a moment t10, FIG. 4K is a schematic diagram of an image of bright and dark stripes at a moment a1, FIG. 4L is a schematic diagram of an image of bright and dark stripes at a moment t12. As shown in FIGS. 4A to 4L, one bright stripe 401 and one adjacent dark stripe 402 constitute one bright and dark stripe 40, which corresponds to one light-emitting cycle of the light-emitting control signal. It should be noted that, in order to clearly describe rolling of the bright and dark stripes, a filling pattern of one dark stripe is different from filling patterns of another two dark stripes in FIGS. 4A to 4L. In FIG. 4A to FIG. 4L, one bright stripe is formed by H1=(N/b1)*a rows of pixels, and one dark stripe is formed by H2=(N/b1)*(1−a1) rows of pixels.

The display panel further includes a touch signal driving circuit 302 arranged in the non-display area 002, and during the display area scanning duration T1, if the number of rows of light-emitting pixel-rows in the display area 001 is fixed, the touch signal driving circuit outputs a touch signal. For example, in FIG. 4A to FIG. 4L, within a period of t1 to t2, a period of t3 to t4, a period of t5 to t6, a period of t7 to t8, a period of t9 to t10, and a period of t11 to t12, the number of rows of the light-emitting pixel-rows in the display area 001 remains unchanged, and within the period of t1 to t2, the period of t5 to t6, and the period of t9 to t10, the number of rows of the light-emitting pixel-rows in the display area 001 is the smallest; and within the period of t3 to t4, the period of t7 to t8, and the period of t11 to t12, the number of rows of the light-emitting pixel-rows in the display area 001 is the largest.

FIG. 5 is a schematic diagram of traces in a fan-out area provided by an embodiment of the present disclosure. As shown in FIG. 5, in the fan-out area, an orthographic projection of a touch trace TP for transmitting touch signals on a plane of the display panel is overlapped with an orthographic projection of a constant voltage signal line PVDD for display on the plane of the display panel. When the number of rows of the light-emitting pixel-rows in the display area is fixed, a voltage drop of a voltage of the PVDD of the organic light-emitting display panel is stable, so that during this period, the touch trace TP transmits the touch signals, a parasitic capacitance between the TP trace and the PVDD is small, and signal interference between the touch and the display is relatively small.

Therefore, according to the organic light-emitting display panel provided above, in one aspect, the touch driving and the display driving are performed simultaneously during the scanning duration of one frame, which increases the time for the source signal driving circuit to transmit data to each row of pixels in the display area, and can simultaneously meet the requirements of narrow steps and high-frequency display. In another aspect, the touch driving is performed during the time where the number of rows of the light-emitting pixel-rows in the display area on the display panel is fixed, and when the number of rows of the light-emitting pixel-rows in the display area is fixed, the voltage drop of the display panel in the display area is stable, and the interference of the touch and the display noise will be reduced, thereby reducing the parasitic capacitance generated when the touch and the display are driven at the same time, and improving the problem of mutual interference between the touch and the display.

In an embodiment, when the number of rows of pixels corresponding to the front-back porch is smaller than the number of rows of one dark stripe and greater than the number of rows of pixels corresponding to one bright stripe, that is, when (N/b1)*a<N2<(N/b1)*(1−a1), the touch signal driving circuit can output touch signals in following two cases:

a. when the number of rows of the light-emitting pixel-rows in the display area is M1 and M1=N*a1−(N/b1)*a1, that is, when the number of rows of the light-emitting pixel-rows in the display area is the smallest, the touch signal driving circuit outputs the touch signal; and b. when the number of rows of the light-emitting pixel-rows in the display area is M1 and M1=N*a, that is, when the number of rows of the light-emitting pixel-rows in the display area is the largest, the touch signal driving circuit outputs the touch signal.

FIG. 6A to FIG. 6L illustrate schematic diagrams of images where bright and dark stripes change with time in one frame. Specifically, FIG. 6A is a schematic diagram of an image of bright and dark stripes at the moment t1, FIG. 6B is a schematic diagram of an image of bright and dark stripes at the moment t2, FIG. 6C is a schematic diagram of an image of bright and dark stripes at the moment t3, FIG.

6D is a schematic diagram of an image of bright and dark stripes at the moment t4, FIG. 6E is a schematic diagram of an image of bright and dark stripes at the moment t5, FIG. 6F is a schematic diagram of an image of bright and dark stripes at the moment t6, FIG. 6G is a schematic diagram of an image of bright and dark stripes at the moment t7, FIG. 6H is a schematic diagram of an image of bright and dark stripes at the moment t8, FIG. 6I is a schematic diagram of an image of bright and dark stripes at the moment t9, FIG. 6J is a schematic diagram of an image of bright and dark stripes at the moment t10, FIG. 6K is a schematic diagram of an image of bright and dark stripes at the moment t11, and FIG. 6L is a schematic diagram of an image of bright and dark stripes at the moment t12. It should be noted that, in order to clearly describe the rolling of the bright and dark stripes, a filling pattern of one dark stripe is different from filling patterns of another two dark stripes in FIGS. 6A to 6L. In FIGS. 6A to 6L, one bright stripe is formed by H1=(N/b1)*a rows of pixels, and one dark stripe is formed by H2=(N/b1)*(1−a1) rows of pixels.

In an embodiment, as shown in FIGS. 6B and 6D, the number N2 of rows of pixels corresponding to the front-back porch is smaller than the number H2 of rows of pixels in one dark stripe 402, and the number N2 of rows of pixels corresponding to the front-back porch is larger than the number H1 of rows of pixels in one bright stripe 401. As shown in FIG. 6A to FIG. 6L, in the period of t2 to t3, the period of t4 to t5, the period of t6 to t7, the period of t8 to t9, the period of t10 to t11 and the period of t12 to t1, the total number of the bright stripes in the display area on the display panel is constant. For example, during the period of t2 to t3, the period of t6 to t7 and the period of t10 to t11, the total number of the bright stripes in the display area is constantly two, the number of rows of light-emitting pixel-rows in the display area during one frame is the least, and the number of the rows of light-emitting pixel-rows is M1=N*a−(N/b1)*a1; during the period of t4 to t5, the period of t8 to t9 and the period of t12 to t1, the total number of the bright stripes in the display area is constantly three, the number of the rows of light-emitting pixel-rows in the display area is the largest during one frame, and the number of the rows of light-emitting pixel-rows is M1=N*a. Therefore, during the period of t2 to t3, the period of t4 to t5, the period of t6 to t7, the period of t8 to t9, the period of t10 to t11 and the period of t12 to t1, the number of the rows of light-emitting pixel-rows in the display area on the display panel is fixed, and the voltage drop of the display panel in the display area is stable. In an embodiment, the touch signal driving circuit can output the touch signal during the period of t2 to t3, the period of t6 to t7 and the period of t10 to t11, that is, when the number of rows of the light-emitting pixel-rows in the display area is the smallest, the touch signal driving circuit outputs the touch signal. In an embodiment, the touch signal driving circuit can output the touch signal during the period of t4 to t5, the period of t8 to t9 and the period of t12 to t1, that is, when the number of rows of the light-emitting pixel-rows in the display area is the largest, the touch signal driving circuit outputs the touch signal.

In an embodiment, when the number of rows of pixels corresponding to the front-back porch is smaller than the number of rows of pixels in one dark stripe and smaller than the number of rows of pixels in one bright stripe, that is, when N2<(N/b1)*(1−a1) and N2<(N/b1)*a, the touch signal driving circuit can output the touch signal in following two cases:

a. when the number of rows of the light-emitting pixel-rows in the display area is M1=N*a−N2, that is, when the number of rows of the light-emitting pixel-rows in the display area is the smallest, the touch signal driving circuit outputs the touch signal; and b. when the number of rows of the light-emitting pixel-rows in the display area is M1=N*a, that is, when the number of rows of the light-emitting pixel-rows in the display area is the largest, the touch signal driving circuit outputs the touch signal.

Figures 7A, 7B, 7C, 7D, 7E, 7F:
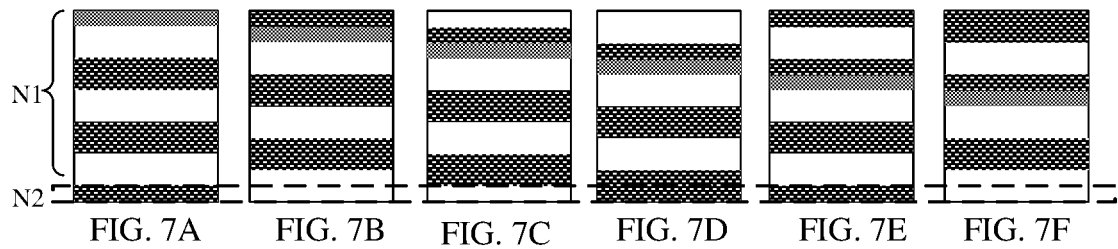
FIGS. 7A to 7L illustrate schematic diagrams of an organic light-emitting display panel at different moments.
Figures 7G, 7H, 7I, 7J, 7K, 7L:
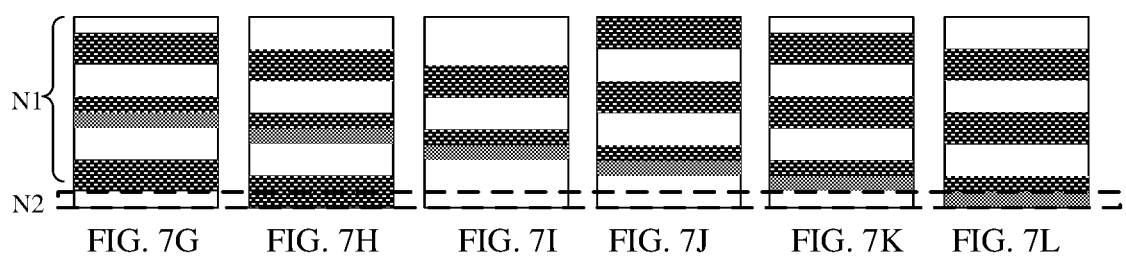

FIG. 7A to FIG. 7L illustrate schematic diagrams of images where bright and dark stripes change during one frame. Specifically, FIG. 7A is a schematic diagram of an image of bright and dark stripes at the moment t1, FIG. 7B is a schematic diagram of an image of bright and dark stripes at the moment t2, FIG. 7C is a schematic diagram of an image of bright and dark stripes at the moment t3, FIG. 7D is a schematic diagram of an image of bright and dark stripes at the moment t4, FIG. 7E is a schematic diagram of an image of bright and dark stripes at the moment t5, FIG. 7F is a schematic diagram of an image of bright and dark stripes at the moment t6, FIG. 7G is a schematic diagram of an image of bright and dark stripes at the moment t7, FIG. 7H is a schematic diagram of an image of bright and dark stripes at the moment t8, FIG. 7I is a schematic diagram of an image of bright and dark stripes at the moment t9, FIG. 7J is a schematic diagram of an image of bright and dark stripes at the moment t10, FIG. 7K is a schematic diagram of an image of bright and dark stripes at the moment t11, and FIG. 7L is a schematic diagram of an image of bright and dark stripes at the moment t12. It should be noted that, in order to clearly describe the rolling of the bright and dark stripes, a filling pattern of one dark stripe is different from filling patterns of another two dark stripes in FIGS. 7A to 7L. In FIGS. 7A to 7L, one bright stripe is formed by H1=(N/b1)*a rows of pixels, and one dark stripe is formed by H2=(N/b1)*(1−a1) rows of pixels.

In an embodiment, as shown in FIGS. 7B and 7D, the number N2 of rows of pixels corresponding to the front-back porch is smaller than the number H2 of rows of pixels in one dark stripe 402, and the number N2 of rows of pixels corresponding to the front-back porch is smaller than the number H1 of rows of pixels in one bright stripe 401. As shown in FIG. 7A to FIG. 7L, in the period of t2 to t3, the period of t4 to t5, the period of t6 to t7, the period of t8 to t9, the period of t10 to t11 and the period of t12 to t1, the total number of the bright stripes in the display area on the display panel is constant. For example, during the period of t2 to t3, the period of t6 to t7 and the period of t10 to t11, the total number of the bright stripes in the display area is constantly 2.5, the number of rows of light-emitting pixel-rows in the display area during one frame is the least, and the number of rows of light-emitting pixel-rows is M1=N*a−N2; during the period of t4 to t5, the period of t8 to t9 and the period of t12 to t1, the total number of the bright stripes in the display area is constantly three, the number of the rows of light-emitting pixel-rows in the display area is the largest during one frame, and the number of the rows of light-emitting pixel-rows is M1=N*a. Therefore, during the period of t2 to t3, the period of t4 to t5, the period of t6 to t7, the period of t8 to t9, the period of t10 to t11 and the period of t12 to t1, the number of the rows of light-emitting pixel-rows in the display area on the display panel is fixed, and the voltage drop of the display panel in the display area is stable. In an embodiment, the touch signal driving circuit can output the touch signal during the period of t2 to t3, the period of t6 to t7 and the period of t10 to t11, that is, the touch signal driving circuit outputs the touch signal when the number of rows of the light-emitting pixel-rows in the display area is the smallest. In an embodiment, the touch signal driving circuit can output the touch signal during the period of t4 to t5, the period of t8 to t9 and the period of t12 to t1, that is, the touch signal driving circuit outputs the touch signal when the number of rows of the light-emitting pixel-rows in the display area is the largest.

In an embodiment, when the number of rows of pixels corresponding to the front-back porch is larger than the number of rows of pixels in one dark stripe and smaller than the number of rows of pixels in one bright stripe, that is, when $(N/b1)*(1-a1)<N2<(N/b1)*a$, the touch signal driving circuit can output the touch signal in following two cases:

a. when the number of rows of the light-emitting pixel-rows in the display area is $M1=N*a-N2$, that is, when the number of rows of the light-emitting pixel-rows in the display area is the smallest, the touch signal driving circuit outputs the touch signal; and b. when the number of rows of the light-emitting pixel-rows in the display area is $M1=N*a1-[N2-(N/b1)*(1-a1)]$, that is, when the number of rows of the light-emitting pixel-rows in the display area is the largest, the touch signal driving circuit outputs the touch signal.

FIG. 4A to FIG. 4L illustrate schematic diagrams of images where bright and dark stripes change during one frame. As shown in FIGS. 4A and 4C, the number N2 of rows of pixels corresponding to the front-back porch is greater than the number H2 of rows of pixels in one dark stripe 402, and the number N2 of rows of pixels corresponding to the front-back porch is smaller than the number H1 of rows of pixels in one bright stripe 401. As shown in FIG. 4A to FIG. 4L, during the period of t1 to t2, the period of t3 to t4, the period of t5 to t6, the period of t7 to t8, the period of t9 to t10 and the period of t11 to t12, the number of rows of the light-emitting pixel-rows in the display area 001 remains unchanged, and during the period of t1 to t2, the period of t5 to t6 and the period of t9 to t10, the number of rows of the light-emitting pixel-rows in the display area 001 is the least, and the number of the light-emitting rows is $M1=N*a1-N2$; during the period of t3 to t4, the period of t7 to t8 and the period of t11 to t12, the number of rows of the light-emitting pixel-rows of the display area 001 is the largest, and the number of the light-emitting rows is $M1=N*a1-[N2-(N/b1)*(1-a1)]$. In an embodiment, the touch signal driving circuit can output the touch signal during the period of t1 to t2, the period of t5 to t6, and the period of t9 to t10, that is, the touch signal driving circuit outputs the touch signal when the number of rows of the light-emitting pixel-rows in the display area is the smallest. In an embodiment, the touch signal driving circuit can output the touch signal during the period of t3 to t4, the period of t7 to t8 and the period of t11 to t12, that is, the touch signal driving circuit outputs the touch signal when the number of rows of the light-emitting pixel-rows in the display area is the largest.

Figures 8A, 8B, 8C, 8D, 8E, 8F, 8G:
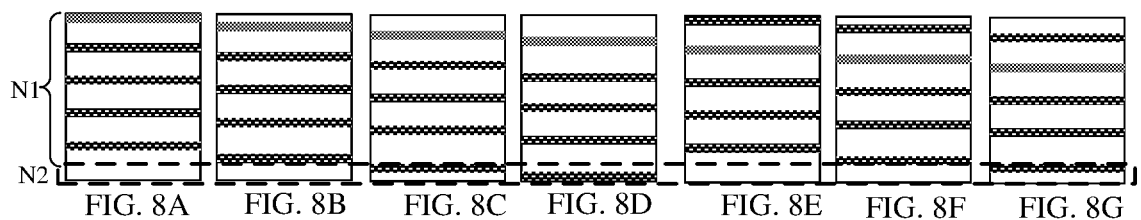
FIGS. 8A to 8T illustrate schematic diagrams of an organic light-emitting display panel at different moments.
Figures 8H, 8I, 8J, 8K, 8L, 8M, 8N:
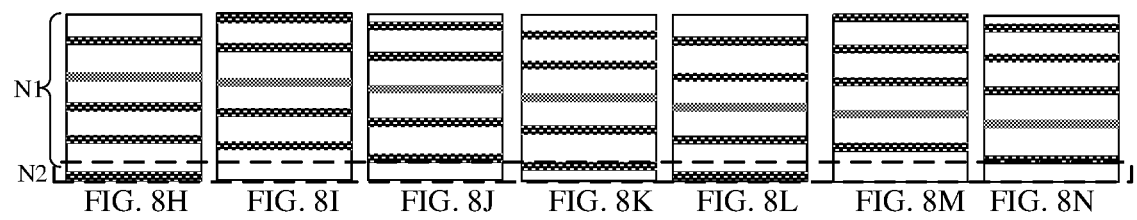
Figures 8O, 8P, 8Q, 8R, 8S, 8T:
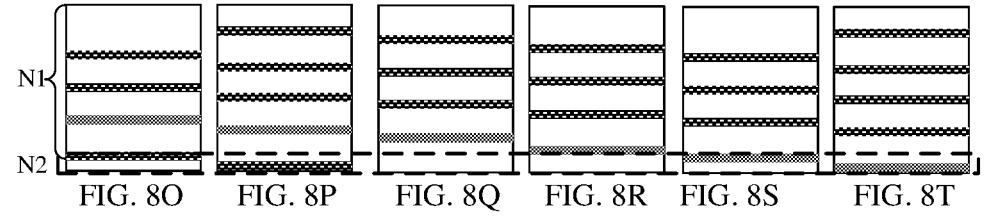

FIG. 8A to FIG. 8T illustrate schematic diagrams of images where bright and dark stripes change with time in one frame. Specifically, FIG. 8A is a schematic diagram of an image of bright and dark stripes at the moment t1, FIG. 8B is a schematic diagram of an image of bright and dark stripes at the moment t2, FIG. 8C is a schematic diagram of an image of bright and dark stripes at the moment t3, FIG. 8D is a schematic diagram of an image of bright and dark stripes at the moment t4, FIG. 8E is a schematic diagram of an image of bright and dark stripes at the moment t5, FIG. 8F is a schematic diagram of an image of bright and dark stripes at the moment t6, FIG. 8G is a schematic diagram of an image of bright and dark stripes at the moment t7, FIG. 8H is a schematic diagram of an image of bright and dark stripes at the moment t8, FIG. 8I is a schematic diagram of an image of bright and dark stripes at the moment t9, FIG. 8J is a schematic diagram of an image of bright and dark stripes at the moment t10, FIG. 8K is a schematic diagram of an image of bright and dark stripes at the moment t11, FIG. 8L is a schematic diagram of an image of bright and dark stripes at the moment t12, FIG. 8M is a schematic diagram of an image of bright and dark stripes at the moment t13, FIG. 8N is a schematic diagram of an image of bright and dark stripes at the moment t14, FIG. 8O is a schematic diagram of an image of bright and dark stripes at the moment t15, FIG. 8P is a schematic diagram of an image of bright and dark stripes at the moment t16, FIG. 8Q is a schematic diagram of an image of bright and dark stripes at the moment t17, FIG. 8R is a schematic diagram of an image of bright and dark stripes at the moment t18, FIG. 8S is a schematic diagram of an image of bright and dark stripes at the moment t19, and FIG. 8T is a schematic diagram of an image of bright and dark stripes at the moment t20. It should be noted that, in order to clearly describe the rolling of the bright and dark stripes, a filling pattern of one dark stripe is different from filling patterns of another two dark stripes in FIGS. 8A to 8T. In FIGS. 8A to 8T, one bright stripe is formed by $H1=(N/b1)*a$ rows of pixels, and one dark stripe is formed by $H2=(N/b1)*(1-a1)$ rows of pixels.

In an embodiment, as shown in FIGS. 8A and 8D, the number N2 of rows of pixels corresponding to the front-back porch is larger than the number H2 of rows of pixels in one dark stripe 402, and the number N2 of rows of pixels corresponding to the front-back porch is smaller than the number H1 of rows of pixels in one bright stripe 401. As shown in FIG. 8A to FIG. 8T, during the period of t1 to t2, the period of t3 to t4, the period of t5 to t6, the period of t7 to t8, the period of t9 to t10, the period of t11 to t12, the period of t14 to t14, the period of t15 to t16, the period of t17 to t18 and the period of t19 to t20, the total number of the bright stripes in the display area on the display panel is constant, and the voltage drop of the display panel in the display area is stable. For example, during the period of t1 to t2, the period of t5 to t6, the period of t9 to t10, the period of t13 to t14 and the period of t17 to t18, the total number of the bright stripes in the display area is constant and the number of the rows of light-emitting pixel-rows in the display area within the time of one frame is the least, and the number of the rows of light-emitting pixel-rows is $M1=N*a-N2$; during the period of t3 to t4, the period of t7 to t8, the period of t11 to t12, the period of t15 to t16 and the period of t19 to t20, the total number of the bright stripes in the display area is constant and the number of the light-emitting rows in the display area is the largest during one frame, and the number of the rows of light-emitting pixel-rows is $M1=N*a1-[N2-(N/b1)*(1-a1)]$. In an embodiment, the touch signal driving circuit can output the touch signal during the period of t1 to t2, the period of t5 to t6, the period of t9 to t10, the period of t13 to t14, and the period of t17 to t18, that is, the touch signal driving circuit outputs the touch signal when the number of rows of the light-emitting pixel-rows in the display area is the smallest. In an embodiment, the touch signal driving circuit can output the touch signal during the period of t3 to t4, the period of t7 to t8, the period of t11 to t12, the period of t15 to t16 and the period of t19 to t20, that is, the touch signal driving circuit outputs the touch signal when the number of rows of the light-emitting pixel-rows in the display area is the largest.

In an embodiment, when the number of rows of pixels corresponding to the front-back porch is greater than the number of rows of pixels in one dark stripe and larger than the number of rows of pixels in one bright stripe, that is, when $(N/b1)*(1-a1)<N2<(N/b1)$ and $(N/b1)*a1<N2<N/b1$, the touch signal driving circuit can output the touch signal in following two cases:

a. when the number of rows of the light-emitting pixel-rows in the display area is $M1=N*a1-(N/b1)*a1$, that is, when the number of rows of the light-emitting pixel-rows in the display area is the smallest, the touch signal driving circuit outputs the touch signal;

b. when the number of rows of the light-emitting pixel-rows in the display area is $M1=N*a1-[N2-(N/b1)*(1-a1)]$, that is, when the number of rows of the light-emitting pixel-rows in the display area is the largest, the touch signal driving circuit outputs the touch signal.

FIGS. 9A to 9L are schematic diagrams of images where bright and dark stripes change with time in one frame. Specifically, FIG. 9A is a schematic diagram of an image of bright and dark stripes at the moment t1, FIG. 9B is a schematic diagram of an image of bright and dark stripes at the moment t2, FIG. 9C is a schematic diagram of an image of bright and dark stripes at the moment t3, FIG. 9D is a schematic diagram of an image of bright and dark stripes at the moment t4, FIG. 9E is a schematic diagram of an image of bright and dark stripes at the moment t5, FIG. 9F is a schematic diagram of an image of bright and dark stripes at the moment t6, FIG. 9G is a schematic diagram of an image of bright and dark stripes at the moment t7, FIG. 9H is a schematic diagram of an image of bright and dark stripes at the moment t8, FIG. 9I is a schematic diagram of an image of bright and dark stripes at the moment t9, FIG. 9J is a schematic diagram of an image of bright and dark stripes at the moment t10, FIG. 9K is a schematic diagram of an image of bright and dark stripes at the moment t11, and FIG. 9L is a schematic diagram of an image of bright and dark stripes at the moment t12. It should be noted that in order to clearly describe the rolling of the bright and dark stripes, a filling pattern of one dark stripe is different from filling patterns of another two dark stripes in FIG. 9A to FIG. 9L. In FIG. 9A to FIG. 9L, one bright stripe is formed by $H1=(N/b1)*a$ rows of pixels, and one dark stripe formed by $H2=(N/b1)*(1-a1)$ rows of pixels.

In an embodiment, as shown in FIGS. 9A and 9C, the number N2 of rows of pixels corresponding to the front-back porch is greater than the number H2 of rows of pixels in one dark stripe 402, and the number N2 of rows of pixels in the front-back porches is greater than the number H1 of rows of pixels in one bright stripe 401. As shown in FIG. 9A to FIG. 9L, during the period of t1 to t2, the period of t3 to t4, the period of t5 to t6, the period of t7 to t8, the period of t9 to t10 and the period of t11 to t12, the total number of the bright stripes in the display area on the display panel is constant. For example, during the period of t1 to t2, the period of t5 to t6 and the period of t9 to t10, the total number of the bright stripes in the display area is constantly two and the number of the rows of light-emitting pixel-rows in the display area is the smallest during one frame, and the number of the rows of light-emitting pixel-rows is $M1=N*a1-(N/b1)*a1$; during the period of t3 to t4, the period of t7 to t8 and the period of t11 to t12, the total number of the bright stripes in the display area is constantly 2.5 and the number of the rows of light-emitting pixel-rows in the display area is the largest during one frame, and the number of the rows of light-emitting pixel-rows is $M1=N*a1-[N2-(N/b1)*(1-a1)]$. Therefore, during the period of t1 to t2, the period of t3 to t4, the period of t5 to t6, the period of t7 to t8, the period of t9 to t10 and the period of t11 to t12, the number of the rows of light-emitting pixel-rows in the display area on the display panel is fixed, and the voltage drop in the display area is stable. In an embodiment, the touch signal driving circuit can output the touch signal during the period of t1 to t2, the period of t5 to t6, and the period of t9 to t10, that is, the touch signal driving circuit outputs the touch signal when the number of rows of the light-emitting pixel-rows in the display area is the smallest. In an embodiment, the touch signal driving circuit can output the touch signal during the period of t3 to t4, the period of t7 to t8, and the period of t11 to t12, that is, the touch signal driving circuit outputs the touch signal when the number of rows of the light-emitting pixel-rows in the display area is the largest.

In an embodiment, in order to improve the problem of interference caused by noises generated by touch and the display, detecting the touch signal is started when the number of rows of the light-emitting pixel-rows in the display area is the smallest. For example, in FIGS. 4A-4L, in the period of 1 to t2, the period of t5 to t6, and the period of t9 to t10, the number of rows of the light-emitting pixel-rows in the display area 001 is the least, and the touch signal driving circuit outputs the touch signal within the period of t1 to t2, the period of t5 to t6, and the period of t9 to t10. Assuming that the number N1 of rows of pixels in the display area is 390, the number N2 of rows of pixels corresponding to the front-back porches is 78, the duty ratio of the light-emitting control signal is 75%, and the number of the light-emitting cycles is 3, which corresponds to the situation of FIGS. 4A-4L. Then, the touch signal driving circuit can output the touch signal during a scanning duration in which the scanning driving circuit scans first to 39th rows of the pixels, a scanning duration in which the scanning driving circuit scans 156th to 195th rows of the pixels, and a scanning duration in which the scanning driving circuit scans 312nd to 351st rows of the pixels, as shown in FIG. 10.

Figure 11:
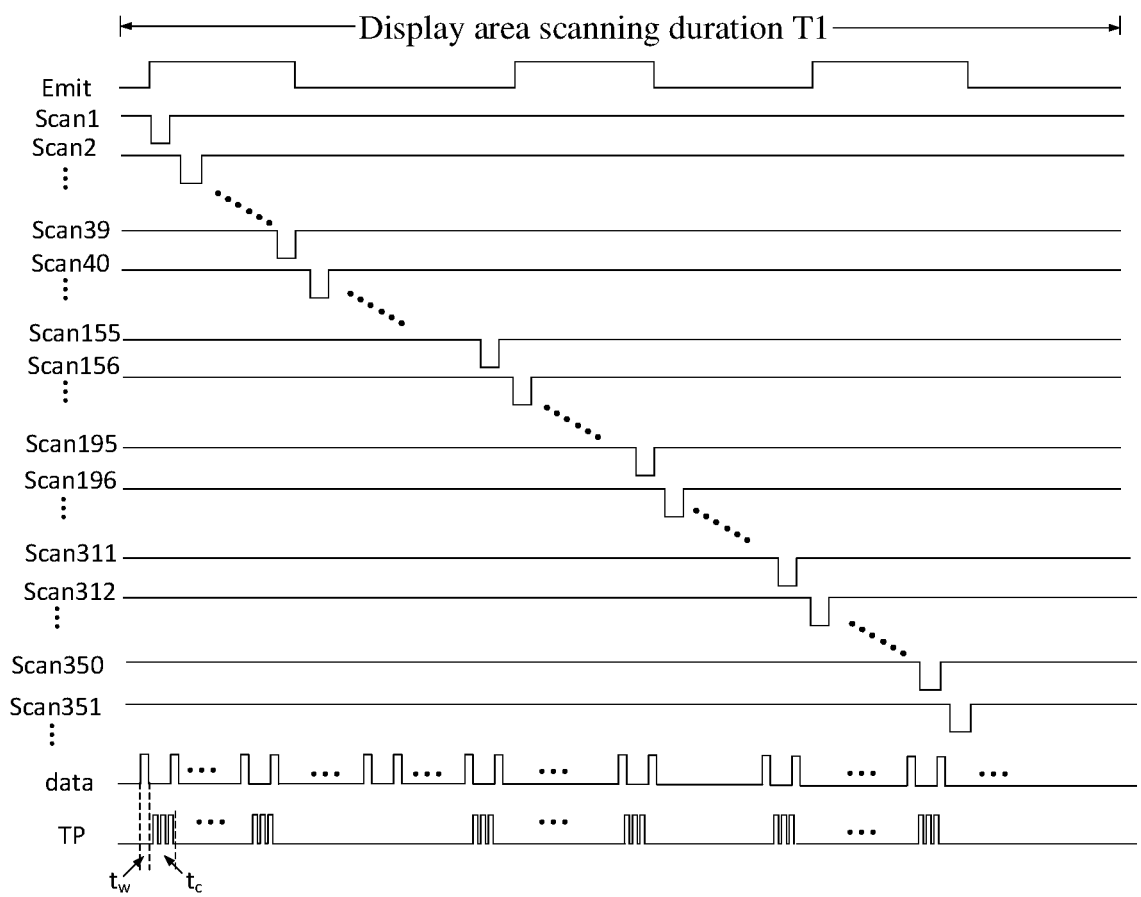
FIG. 11 is a timing sequence diagram of working of an organic light-emitting display panel provided by the present disclosure.

In an embodiment, in order to reduce the interference caused by noise generated by touch and the display, touch signal driving circuit outputs touch signals and the time in which a source signal driving circuit transmits data to all rows of pixels is saved. FIG. 11 is a working timing sequence diagram of an organic light-emitting display panel provided by the present disclosure. As shown in FIG. 11, the display area scanning duration further includes a data signal writing duration $t_w$ during which the source signal driving circuit 301 transmits data to each row of pixels, and in terms of timing sequence, the touch duration $t_c$ is located between two data signal writing durations. Assuming that the working frequency of the display panel is 60 Hz, the time for the source signal driving circuit to transmit data is 2.5 μs, the duty cycle of the light-emitting control signal is 75%, the multiplexer (MUX) has one input terminal and six output terminal corresponding to the input terminal, and during one frame, the time for touch driving is at least: 16.7 ms*¼*(35.7−2.5*6)/35.7=2.4 ms, and time for scanning one row of pixels in the display area is 16.7/(390+78)=35.7 μs.

In an embodiment, in order to increase the time during which touch driving is performed, the touch signal driving circuit can output the touch signal within time during which the number of rows of the light-emitting pixel rows in the display area is fixed. In one light-emitting cycle, a case where the number of the rows of the light-emitting pixel-rows is largest in the display area occurs once, and a case where the number of the rows of the light-emitting pixel-rows is smallest in the display area also occurs once. That is, one light-emitting cycle includes two touch durations during each of which the touch signal driving circuit outputs the touch signal, and thus b1 light-emitting cycles includes 2b1 touch durations. For example, if there are three light-emitting cycles, there are six touch durations, such as, the period of t1 to t2, the period of t3 to t4, the period of t5 to t6, the period of t7 to t8, the period of t9 to t10, and the period of t11 to t12 in FIG. 4A to FIG. 4L. For example, if there are 5 light-emitting cycles, then there are 10 touch durations, such as, the period of t1 to t2, the period of t3 to t4, the period of t5 to t6, the period of t7 to t8, the period of t9 to t10, the period of t11 to t12, the period of t14 to t14, the period of t15 to t16, the period of t17 to t18, and the period of t19 to t20 in FIG. 8A to FIG. 8T.

In an embodiment, the source signal driving circuit and the touch signal driving circuit are controlled by the same driver chip.

Figure 12:
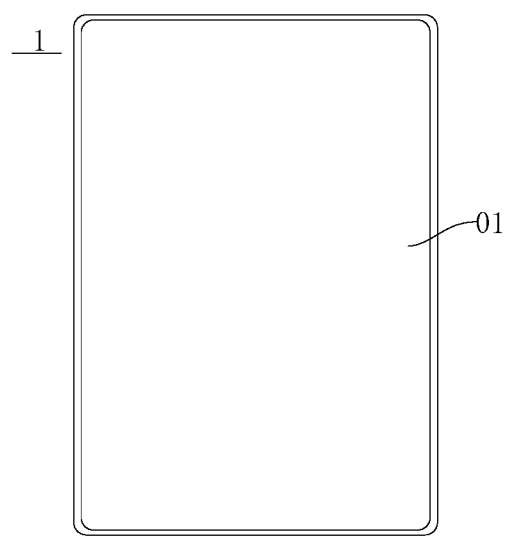
FIG. 12 is a schematic diagram of a display device provided by an embodiment of the present disclosure.

FIG. 12 is a schematic diagram of a display device provided by an embodiment of the present disclosure. As shown in FIG. 12, the display device 1 includes any one organic light-emitting display panel 01 as described above. The display device shown in FIG. 12 is exemplary illustrated, and the display device can be any electronic device having a display function, such as a mobile phone, a tablet computer, a notebook computer, an electronic paper book, or a television. Since the display device provided by the embodiment of the present disclosure includes the above-mentioned display panel, with this display device, by performing the touch driving and the display driving simultaneously, the time for the source signal driving circuit to transmit data to the pixels in the display area is increased, which can meet the needs of narrow steps and high-frequency display at the same time. In addition, the touch driving duration is within the duration where the number of rows of the light-emitting pixel-rows in the display area on the display panel is fixed, and when the number of rows of the light-emitting pixel-rows in the display area is fixed, the voltage drop of the display panel in the display area is stable, and the interference caused by noises generated by touch and the display will be reduced, thereby reducing the parasitic capacitance generated when the touch and the display are driven at the same time, and improving the problem of mutual interference between the touch and the display.

Based on the same inventive concept, an embodiment of the present disclosure also provides a method for driving an organic light-emitting display panel, and since the method for driving the organic light-emitting display panel solves the problem in a principle similar to that of the aforementioned organic light-emitting display panel, the implementation of the method for driving the organic light-emitting display panel can refer to the implementation of the organic light-emitting display panel, and will not be repeated herein.

Specifically, the method for driving the above organic light-emitting display panel provided by the present disclosure includes: providing, by the light-emitting driving circuit, the light-emitting control signal having b1 light-emitting cycles to each row of the plurality of rows of pixels during the scanning duration of each frame; scanning, by the scanning driving circuit, each row of the plurality of rows of pixels during the scanning duration of each frame; writing, by the source signal driving circuit, source data to each row of the plurality of rows of pixels during the scanning duration of each frame, and providing, by the touch signal driving circuit, a touch driving signal to the organic light-emitting display panel during each frame; providing, by the touch signal driving circuit, the touch signal to the organic light-emitting display panel; and remaining the number of rows of light-emitting pixel-rows of the organic light-emitting display panel unchanged. Each of the light-emitting pixel-rows is a row of the plurality of rows of pixels, and in each light-emitting pixel-row, the pixels thereof are supplied with the effective turn-on signal of the light-emitting control signal and emit light.

In an embodiment, in the above-mentioned method for driving the organic light-emitting display panel provided in the present disclosure, the scanning duration of one frame includes c1 touch durations, where c1 is equal to 2b1.

In an embodiment, in the above method for driving the organic light-emitting display panel provided in the present disclosure, the display area scanning duration further includes multiple data signal writing durations, during each of which the source signal driving circuit writes data to the display panel. In terms of the timing sequence, the touch duration is located between two data signal writing durations.

In an embodiment, in the above-mentioned method for driving the organic light-emitting display panel provided in the present disclosure, the source signal driving circuit and the touch signal driving circuit are controlled by the same driver chip.

In an embodiment, when the number of rows of pixels corresponding to the front-back porch is smaller than the number of rows of pixels in one dark stripe and greater than the number of rows of pixels in one bright stripe, that is, when $(N/b1)*a < N2 < (N/b1)*(1-a1)$, the touch signal driving circuit can output touch signals in following two cases:

a. when the number of rows of the light-emitting pixel-rows in the display area is $M1 = N*a1 - (N/b1)*a1$, that is, when the number of rows of the light-emitting pixel-rows in the display area is the smallest, the touch signal driving circuit outputs the touch signal; and b. when the number of rows of the light-emitting pixel-rows in the display area is $M1 = N*a$, that is, when the number of rows of the light-emitting pixel-rows in the display area is the largest, the touch signal driving circuit outputs the touch signal.

In an embodiment, the number of rows of pixels corresponding to the front-back porch is smaller than the number of rows of pixels in one dark stripe and smaller than the number of rows of pixels in one bright stripe, that is, when $N2 < (N/b1)*(1-a1)$ and $N2 < (N/b1)*a1$, the touch signal driving circuit can output touch signals in following two cases:

a. when the number of rows of the light-emitting pixel-rows in the display area is $M1 = N*a - N2$, that is, when the number of rows of the light-emitting pixel-rows in the display area is the smallest, the touch signal driving circuit outputs the touch signal; and b. when the number of rows of the light-emitting pixel-rows in the display area is $M1 = N*a$, that is, when the number of rows of the light-emitting pixel-rows in the display area is the largest, the touch signal driving circuit outputs the touch signal.

In an embodiment, the number of rows of pixels corresponding to the front-back porch is greater than the number of rows of pixels in one dark stripe and smaller than the number of rows of pixels in one bright stripe, that is, when $(N/b1)*(1-a1) < N2 < (N/b1)*a1$, the touch signal driving circuit can output touch signals in following two cases:

a. when the number of rows of the light-emitting pixel-rows in the display area is $M1 = N*a - N2$, that is, when the number of rows of the light-emitting pixel-rows in the display area is the smallest, the touch signal driving circuit outputs the touch signal; and b. when the number of rows of the light-emitting pixel-rows in the display area is $M1=N*a1-[N2-(N/b1)*(1-a1)]$, that is, when the number of rows of the light-emitting pixel-rows in the display area is the largest, the touch signal driving circuit outputs the touch signal.

In an embodiment, the number of rows of pixels corresponding to the front-back porches is larger than the number of rows of pixels in one dark stripe and larger than the number of rows of pixels in one bright stripe, that is, when $(N/b1)*(1-a1)<N2<(N/b1)$ and $(N/b1)*a1<N2<N/b1$, the touch signal driving circuit can output touch signals in following two cases:

a. when the number of rows of the light-emitting pixel-rows in the display area is $M1=N*a-(N/b)*a$, that is, when the number of rows of the light-emitting pixel-rows in the display area is the smallest, the touch signal driving circuit outputs the touch signal; and b. when the number of rows of the light-emitting pixel-rows in the display area is $M1=N*a1-[N2-(N/b1)*(1-a1)]$, that is, when the number of rows of the light-emitting pixel-rows in the display area is the largest, the touch signal driving circuit outputs the touch signal.

The organic light-emitting display panel, the display device, and the method for driving the organic light-emitting display panel are provided by the present disclosure, the touch driving and the display driving are performed at the same time, which increases the time for the source signal driving circuit to transmit data to the pixels in the display area and meet the needs of narrow steps and high-frequency display at the same time. The touch duration is set within the duration during which the number of rows of the light-emitting pixel-rows in the display area on the display panel is fixed. When the number of rows of the light-emitting pixel-rows in the display area is fixed, the voltage drop of the display panel in the display area is stable, and the interference caused by noises generated by touch and the display and the display will be reduced, thereby reducing the parasitic capacitance generated when the touch and the display are driven at the same time, and improving the problem of mutual interference between the touch and the display.

The above only describes some embodiments of the present disclosure and are not intended to limit the present disclosure.

What is claimed is:

1. An organic light-emitting display panel, the organic light-emitting display panel having a display area and a non-display area, and the organic light-emitting display panel comprising:
a plurality of rows of pixels arranged in the display area;
a scanning driving circuit arranged in the non-display area, wherein the scanning driving circuit is configured to, within a scanning duration of each frame, provide a scanning control signal to each row of the plurality of rows of pixels;
a light-emitting driving circuit arranged in the non-display area, wherein the light-emitting driving circuit is configured to, within the scanning duration of each frame, provide a light-emitting control signal having b1 light-emitting cycles to each row of the plurality of rows of pixels, where b1 is a positive integer, and a duty cycle of an effective turn-on signal of the light-emitting control signal is a1; and
a data driving circuit arranged in the non-display area and comprising a source signal driving circuit and a touch signal driving circuit,
wherein the scanning duration of each frame comprises a display area scanning duration and a front-back porch duration, the display area scanning duration is $N1*t$ during which N1 rows of the plurality of rows of pixels are scanned, the front-back porch duration is $N2*t$ that is equal to a period for which N2 rows of the plurality of rows of pixels are scanned, and the scanning duration of each frame is $N*t$ that is equal to a period for which N rows of the plurality of rows of pixels are scanned, where $N=N1+N2=n*b1$, n is a positive integer, and t is a time to scan one row of pixels;
wherein the display area scanning duration comprises at least one touch duration during which the touch signal driving circuit provides a touch signal to the organic light-emitting display panel;
wherein during the at least one touch duration, a number M1 of rows of light-emitting pixel-rows of the display panel remains unchanged, and each of the light-emitting pixel-rows is a row of the plurality of rows of pixels, in which the pixels thereof are supplied with the effective turn-on signal of the light-emitting control signal; and
wherein $(N/b1)*a1<N2<(N/b1)*(1-a1)$; or $N2<(N/b1)*(1-a1)$ and $N2<(N/b1)*a1$; or $(N/b1)*(1-a1)<N2<(N/b1)*a1$; or $(N/b1)*(1-a1)<N2<(N/b1)$ and $(N/b1)*a1<N2<N/b1$.

2. The organic light-emitting display panel according to claim 1, wherein, in a case where $(N/b1)*a1<N2<(N/b1)*(1-a1)$, $M1=N*a1-(N/b1)*a1$.

3. The organic light-emitting display panel according to claim 1, wherein, in a case where $(N/b1)*a1<N2<(N/b1)*(1-a1)$, $M1=N*a1$.

4. The organic light-emitting display panel according to claim 1, wherein, in a case where $N2<(N/b1)*(1-a1)$ and $N2<(N/b1)*a1$, $M1=N*a1-N2$.

5. The organic light-emitting display panel according to claim 1, wherein, in a case where $N2<(N/b1)*(1-a1)$ and $N2<(N/b1)*a1$, $M1=N*a1$.

6. The organic light-emitting display panel according to claim 1, wherein, in a case where $(N/b1)*(1-a1)<N2(N/b1)*a1$, $M1=N*a1-N2$.

7. The organic light-emitting display panel according to claim 1, wherein, in a case where $(N/b1)*(1-a1)<N2(N/b1)*a1$, $M1=N*a1-[N2-(N/b1)*(1-a1)]$.

8. The organic light-emitting display panel according to claim 1, wherein, in a case where $(N/b1)*(1-a1)<N2<(N/b1)$ and $(N/b1)*a1<N2<N/b1$, $M1=N*a1-(N/b1)*a1$.

9. The organic light-emitting display panel according to claim 1, wherein, in a case where $(N/b1)*(1-a1)<N2<(N/b1)$ and $(N/b1)*a1<N2<N/b1$, $M1=N*a1-[N2-(N/b1)*(1-a1)]$.

10. The organic light-emitting display panel according to claim 1, wherein the at least one touch duration comprises c1 touch durations, where c1 is equal to 2b1.

11. The organic light-emitting display panel according to claim 1, wherein the display area scanning duration further comprises a plurality of data signal writing durations, during each of which the source signal driving circuit writes data to the organic light-emitting display panel; and
one of the at least one touch duration is between two of the plurality of data signal writing durations.

12. The organic light-emitting display panel according to claim 1, wherein the source signal driving circuit and the touch signal driving circuit are controlled by a same driver chip.

13. A display device, comprising an organic light-emitting display panel, wherein the organic light-emitting display panel has a display area and a non-display area; and the organic light-emitting display panel comprises:
- a plurality of rows of pixels arranged in the display area;
- a scanning driving circuit arranged in the non-display area, wherein the scanning driving circuit is configured to, within a scanning duration of each frame, provide a scanning control signal to each row of the plurality of rows of pixels;
- a light-emitting driving circuit arranged in the non-display area, wherein the light-emitting driving circuit is configured to, within the scanning duration of each frame, provide a light-emitting control signal having b1 light-emitting cycles to each row of the plurality of rows of pixels, where b1 is a positive integer, and a duty cycle of an effective turn-on signal of the light-emitting control signal is a1; and
- a data driving circuit arranged in the non-display area and comprising a source signal driving circuit and a touch signal driving circuit,
- wherein the scanning duration of each frame comprises a display area scanning duration and a front-back porch duration, the display area scanning duration is N1*t during which N1 rows of the plurality of rows of pixels are scanned, the front-back porch duration is N2*t that is equal to a period for which N2 rows of the plurality of rows of pixels are scanned, and the scanning duration of each frame is N*t that is equal to a period for which N rows of the plurality of rows of pixels are scanned, where N=N1+N2=n*b1, n is a positive integer, and t is a time to scan one row of pixels,
- wherein the display area scanning duration comprises at least one touch duration during which the touch signal driving circuit provides a touch signal to the organic light-emitting display panel;
- wherein during the at least one touch duration, a number M1 of rows of light-emitting pixel-rows of the organic light-emitting display panel remains unchanged, and each of the light-emitting pixel-rows is a row of the plurality of rows of pixels in which the pixels thereof are supplied with the effective turn-on signal of the light-emitting control signal; and
- wherein $(N/b1)*a1<N2<(N/b1)*(1-a1)$; or $N2<(N/b1)*(1-a1)$ and $N2<(N/b1)*a1$; or $(N/b1)*(1-a1)<N2<(N/b1)*a1$; or $(N/b1)*(1-a1)<N2<(N/b1)$ and $(N/b1)*a1<N2<N/b1$.

14. A method for driving an organic light-emitting display panel, wherein the organic light-emitting display panel has a display area and a non-display area; and the organic light-emitting display panel comprises:
- a plurality of rows of pixels arranged in the display area;
- a scanning driving circuit arranged in the non-display area, wherein the scanning driving circuit is configured to, within a scanning duration of each frame, provide a scanning control signal to each row of the plurality of rows of pixels;
- a light-emitting driving circuit arranged in the non-display area, wherein the light-emitting driving circuit is configured to, within the scanning duration of each frame, provide a light-emitting control signal having b1 light-emitting cycles to each row of the plurality of rows of pixels, where b1 is a positive integer, and a duty cycle of an effective turn-on signal of the light-emitting control signal is a1; and
- a data driving circuit arranged in the non-display area and comprising a source signal driving circuit and a touch signal driving circuit,
- wherein the scanning duration of each frame comprises a display area scanning duration and a front-back porch duration, the display area scanning duration is N1*t during which N1 rows of the plurality of rows of pixels are scanned, the front-back porch duration is N2*t that is equal to a period for which N2 rows of the plurality of rows of pixels are scanned, and the scanning duration of each frame is N*t that is equal to a period for which N rows of the plurality of rows of pixels are scanned, where N=N1+N2=n*b1, n is a positive integer, and t is a time to scan one row of pixels;
- the display area scanning duration comprises at least one touch duration during which the touch signal driving circuit provides a touch signal to the organic light-emitting display panel;
- during the at least one touch duration, a number M1 of rows of light-emitting pixel-rows of the display panel remains unchanged, and each of the light-emitting pixel-rows is a row of the plurality of rows of pixels, in which the pixels thereof are supplied with the effective turn-on signal of the light-emitting control signal; and
- $(N/b1)*a1<N2<(N/b1)*(1-a1)$; or $N2<(N/b1)*(1-a1)$ and $N2<(N/b1)*a1$; or $(N/b1)*(1-a1)<N2<(N/b1)*a1$; or $(N/b1)*(1-a1)<N2<(N/b1)$ and $(N/b1)*a1<N2<N/b1$;

wherein the method comprises:
- providing, by the light-emitting driving circuit, the light-emitting control signal having b1 light-emitting cycles to each row of the plurality of rows of pixels during the scanning duration of each frame;
- scanning, by the scanning driving circuit, each row of the plurality of rows of pixels during the scanning duration of each frame;
- writing, by the source signal driving circuit, source data to each row of the plurality of rows of pixels during the scanning duration of each frame, and providing, by the touch signal driving circuit, a touch driving signal to the organic light-emitting display panel during the scanning duration of each frame;
- providing, by the touch signal driving circuit, the touch signal to the organic light-emitting display panel; and
- remaining the number of rows of light-emitting pixel-rows of the organic light-emitting display panel unchanged.

15. The method according to claim 14, wherein the at least one touch duration comprises c1 touch durations, where c1 is equal to 2b1.

16. The method according to claim 14, wherein the display area scanning duration further comprises a plurality of data signal writing durations, during each of which the source signal driving circuit writes data to the organic light-emitting display panel; and
- one of the at least one touch period is between two of the plurality of data signal writing periods.

* * * * *